(12) United States Patent
Sonnekalb

(10) Patent No.: US 8,549,260 B2
(45) Date of Patent: Oct. 1, 2013

(54) APPARATUS FOR PROCESSING DATA AND METHOD FOR GENERATING MANIPULATED AND RE-MANIPULATED CONFIGURATION DATA FOR PROCESSOR

(75) Inventor: Steffen Marc Sonnekalb, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 509 days.

(21) Appl. No.: 12/361,965

(22) Filed: Jan. 29, 2009

(65) Prior Publication Data
US 2010/0191933 A1 Jul. 29, 2010

(51) Int. Cl.
*G06F 9/00* (2006.01)

(52) U.S. Cl.
USPC .............................................. 712/30; 726/26

(58) Field of Classification Search
USPC .......................................................... 712/30
See application file for complete search history.

(56) References Cited

U.S. PATENT DOCUMENTS

| | | | | |
|---|---|---|---|---|
| 4,580,246 A | * | 4/1986 | Sibigtroth | 365/195 |
| 4,698,750 A | * | 10/1987 | Wilkie et al. | 365/185.04 |
| 4,796,235 A | * | 1/1989 | Sparks et al. | 365/189.07 |
| 4,821,240 A | * | 4/1989 | Nakamura et al. | 365/195 |
| 4,924,423 A | * | 5/1990 | Vassiliadis et al. | 708/531 |
| 5,467,396 A | * | 11/1995 | Schossow et al. | 713/193 |
| 5,673,390 A | * | 9/1997 | Mueller | 714/57 |
| 5,923,892 A | * | 7/1999 | Levy | 712/31 |
| 6,334,190 B1 | * | 12/2001 | Silverbrook et al. | 713/500 |
| 6,904,504 B2 | * | 6/2005 | Kahn et al. | 711/163 |
| 6,959,391 B1 | * | 10/2005 | Baldischweiler | 726/34 |
| 2003/0084309 A1 | * | 5/2003 | Kohn | 713/189 |
| 2003/0182571 A1 | * | 9/2003 | Hashimoto et al. | 713/194 |
| 2003/0182572 A1 | * | 9/2003 | Cowan et al. | 713/200 |
| 2004/0210737 A1 | * | 10/2004 | Ness | 712/1 |
| 2004/0225885 A1 | * | 11/2004 | Grohoski et al. | 713/189 |
| 2005/0240811 A1 | * | 10/2005 | Safford et al. | 714/11 |
| 2006/0107107 A1 | * | 5/2006 | Michaelis et al. | 714/11 |
| 2006/0107133 A1 | * | 5/2006 | Ceskutti et al. | 714/718 |
| 2006/0259435 A1 | * | 11/2006 | Moritzen | 705/57 |
| 2007/0083795 A1 | * | 4/2007 | Kudelski | 714/38 |
| 2007/0233982 A1 | * | 10/2007 | Chen et al. | 711/163 |
| 2008/0046762 A1 | * | 2/2008 | Kershaw et al. | 713/193 |
| 2008/0250228 A1 | * | 10/2008 | Elliott et al. | 712/205 |
| 2010/0031064 A1 | * | 2/2010 | Walmsley | 713/194 |
| 2011/0072279 A1 | * | 3/2011 | Milliken | 713/194 |

OTHER PUBLICATIONS

ISSCC95 (Large-Scale Integration versus Multi-Chip Modules); ISSCC95 Evening Discussion Session / TE6; 1995 IEEE International Solid-State Circuits Conference; Feb. 16, 1995; 2 pages.*
Nagano et al. (An Intrusion Detection System using Alteration of Data); This paper appears in: Advanced Information Networking and Applications, 2006. AINA 2006. 20th International Conference on; Issue Date: Apr. 18-20, 2006; on pp. 6 pp.*

* cited by examiner

*Primary Examiner* — Keith Vicary
(74) *Attorney, Agent, or Firm* — Schiff Hardin LLP

(57) ABSTRACT

Some embodiments comprise an apparatus for processing data, the apparatus having a second configurable processor configured to process data using second configuration data, and a configuration data re-manipulator configured to retrieve manipulated second configuration data and first data of a first processor, to re-manipulate the manipulated second configuration data depending on the first data, and to feed the re-manipulated second configuration data to the second configurable processor as the second configuration data.

23 Claims, 16 Drawing Sheets

APPARATUS FOR PROCESSING DATA AND METHOD FOR GENERATING MANIPULATED AND RE-MANIPULATED CONFIGURATION DATA FOR PROCESSOR

TECHNICAL FIELD

Embodiments relate to an apparatus for processing data using configuration data and to a manipulation and re-manipulation of the configuration data so that an error or a manipulation of the configuration data can be recognized.

For various reasons the configuration data for a processor's functionality in an integrated circuit sometimes have to be protected against an unauthorized change or manipulation of the configuration data. For example, a security micro-controller may be designated for special security applications, like personal identification, money cards, pay TV or access rights to certain areas or buildings. Such a micro-controller may comprise data processing functionalities or mechanism to protect the chip against an illegal attack or manipulation. Such an attack may be, for example, a "forcing" of data or a "probing" of data in order to retrieve information about the functionality of the chip, to change the configuration of the chip or to identify data on the chip. Therefore, the configuration data, for example, for the security features of such a security micro-controller may be the target of manipulations trials. Such a manipulation, or also an error, should be avoided to guarantee the proper functionality of the respective processor and therewith the protection of data and algorithm on the chip.

DETAILED DESCRIPTION OF THE EMBODIMENTS

Figure 1:
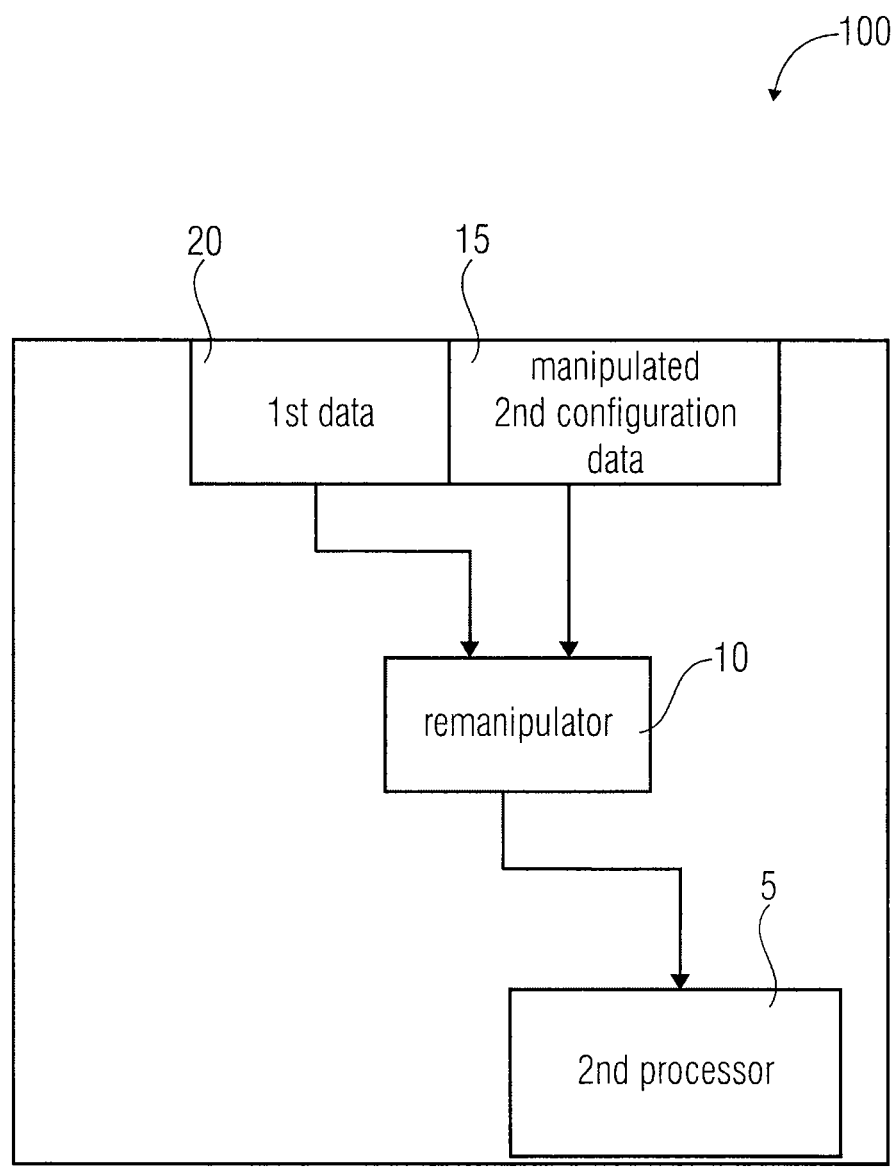
FIG. 1 shows a schematic drawing of an apparatus for processing data with a re-manipulator and a second configurable processor according to an embodiment.

In FIG. 1, a schematic diagram of an apparatus 100 for processing data is shown. The apparatus 100 comprises a second configurable processor 5 for processing data using second configuration data. The apparatus 100 further comprises a configuration data re-manipulator 10, which is configured to re-manipulate manipulated second configuration data 15. The configuration data re-manipulator 10 can be adapted to read or retrieve the manipulated second configuration data 15 and first data 20. First data 20 may be used by a first processor 25 for processing data. First data 20 may be input data, output data or an intermediate result of a first processor 25. The configuration data re-manipulator 10 may be configured to re-manipulate the manipulated second configuration data 15, depending on the first data 20. The configuration data re-manipulator 10 may be able to feed the re-manipulated second configuration data to the second configurable processor 5 as the second configuration data. Based on the second configuration data received from the configuration data re-manipulator 10 the second configurable processor 5 performs a processing of data.

According to embodiments, the apparatus 100, 100*a-i* may be an integrated circuit on a chip, wherein the integrated circuit may fulfill different tasks, functionalities or mechanism. Each of those tasks, functionalities or mechanisms may be performed by a sub-circuit or a processor for processing data. The exact manner how a sub-circuit or a processor performs a certain functionality, task or mechanism may be dependent on the configuration data for the respective processors. In other words the configuration data or the setting for a certain chip functionality may determine the exact manner how a task is fulfilled by a processor or a sub-circuit. A typical changeable setting of an chip may be, for example, the driver strength, the latency, or to turn on or off certain control or security features of the integrated circuit. The configuration data of a setting can be changed, for example, by a user. The configuration data for the different functionalities of a chip may be stored in a configuration memory of the chip.

Such a configuration memory may be a register comprising flip-flops configured to store the configuration data bit by bit.

According to some embodiments, such an apparatus for processing data may be a security micro-controller comprising security mechanisms to protect data or algorithms on the chip. The security mechanisms for security features of a micro-controller may be set by means of configuration data, which may be stored in a register on the chip. According to some embodiments, a first configurable processor may relate to such security features or security mechanism. The first processor 25 may perform such security relevant functionalities based on the first data 20, for example, based on first configuration data. Such an security relevant functionality may be an error detection mechanism, an unauthorized access detection etc. The second configurable processor 5 for processing data may relate to another functionality of the chip, using second configuration data.

According to some embodiments, an attack, an error or a manipulation of the first data 20 or the manipulated second configuration data 15 may result in a malfunction, an error message or an erroneous processing result of the second processor 5. The reason for that may be a re-manipulation of the manipulated second configuration data in un-manipulated second configuration data for the second configurable processor 5, which may cause an error or malfunction of the process performed by the second configurable processor 5. This means that changing the configuration data may cause an error or malfunction of the functionality or process performed by the second configurable processor 5. The second configurable processor 5 may indicate an attack, error or manipulation of the first data 20 or the manipulated second configuration data 15 by the way how the data are processed by the second configurable processor 5. This means, after an error or manipulation, the second configuration data may be changed in a way so that the data processing, by means of the second configurable processor 5 is different to a data processing by means of the second configurable processor 5 before an error or manipulation of the first data 20 or the manipulated second configuration data 15.

According to an embodiment, the second configurable processor 5 may be configured to output an error message or an erroneous processing result, when the manipulated second configuration data, which are output by the configuration data re-manipulator 10 are different from the second configuration data used by the second configurable processor 5 for processing data before a configuration data manipulation.

Figure 2:
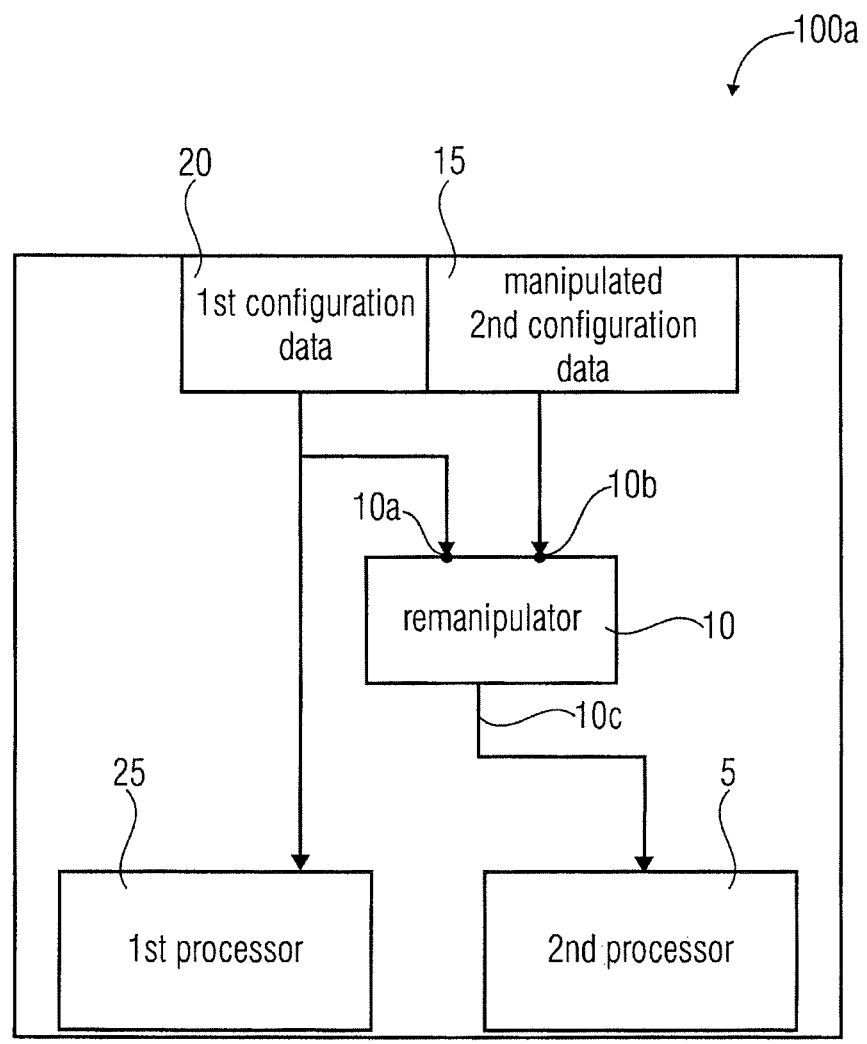
FIG. 2 shows another schematic drawing of an apparatus for processing data with a re-manipulator, a first configurable processor and a second configurable processor according to an embodiment.

According to some embodiments the apparatus 100a further comprises a first processor 25 (see FIG. 2). The first processor 25 may be a configurable processor or a first configurable processor and the first data 20 may be configuration data or first configuration data for the first configurable processor. The configuration data may be used to configure the first configurable processor to process data in a certain way defined by the first configuration data. According to another embodiment the first data 20 may be input data for the first processor 25 or output data of the first processor 25. The first processor 25 may be able to receive input data and/or to generate output data.

As it is shown in FIG. 2, the apparatus 100a for processing data may comprise, besides a second configurable processor 5, also a first configurable processor 25 for processing data, using first configuration data 20. According to this embodiment, the apparatus 100 may again comprise a configuration data re-manipulator 10, wherein the configuration data re-manipulator 10 is coupled to the first configuration data and to the manipulated second configuration data. An output 10c of the configuration data re-manipulator 10 is coupled to the second configurable processor 5.

The first configurable processor may process, for example, security relevant data. Therefore, the first configuration data may comprise security relevant configuration data. In this embodiment, the first configurable processor 25 may be configured to perform a security relevant data processing functionality. The second configurable processor 5 may be configured to perform a data processor functionality strongly depending on the second configuration data. This means that a change of the second configuration data may cause a significant change of the data processor functionality. As a consequence, it may be obvious for users of the apparatus, that an error or a manipulation of the first configuration data or the manipulated second configuration data 15 has taken place.

According to a further embodiment the apparatus 100a for processing data may comprise a first processor 25. This first processor 25 may be configured to use or generate the first data 20 at a first time instant or first point in time. Further the configuration data re-manipulator 10 may be adapted to re-manipulate the manipulated second configuration data 15 depending on the first data 20 at a second time instant or second point in time being later than the first time instant or point in time. The second processor 5 may perform the processing of data based on the second configuration data later than the first processor 25 to process or generate data.

Figure 3:
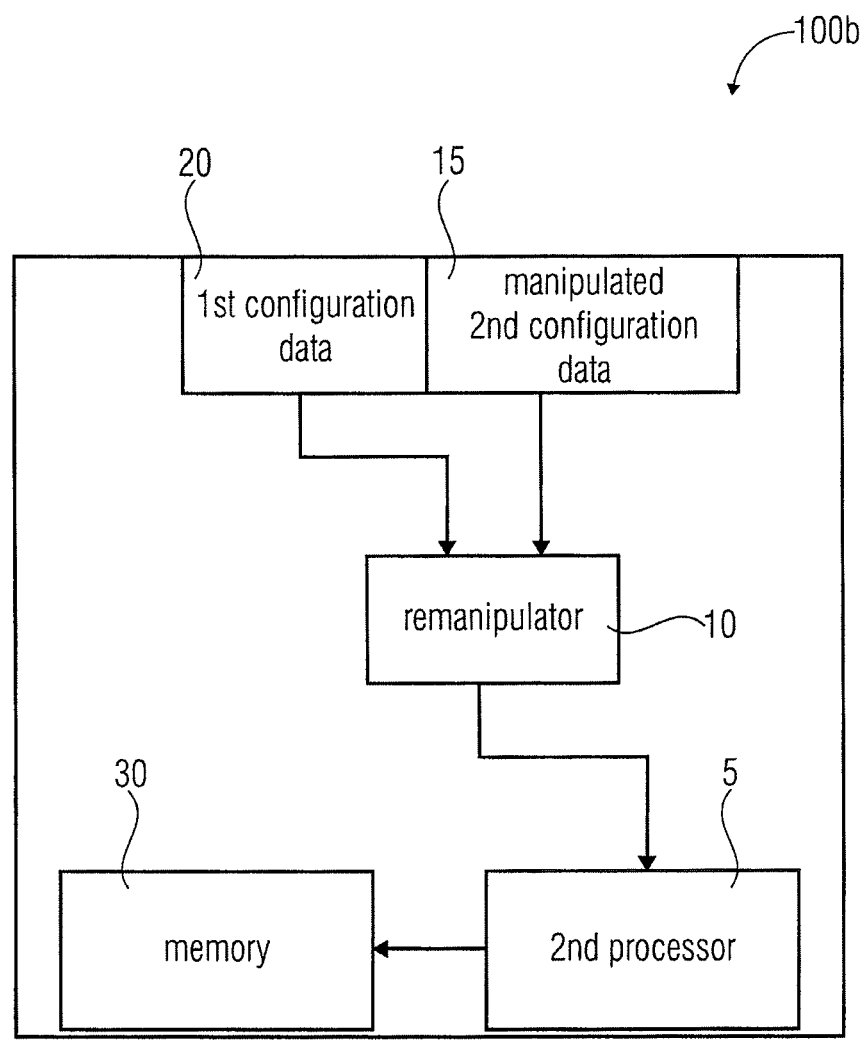
FIG. 3 shows a schematic drawing of an apparatus for processing data further comprising a memory.

In FIG. 3, another schematic drawing of an embodiment is depicted. According to this embodiment, an apparatus 100b comprises again a configuration data re-manipulator 10, first configuration data 20, manipulated second configuration data 15 and a second configurable processor 5. According to this embodiment the second configurable processor 5 may be coupled to a memory 30 which may be integrated on the apparatus, in a respective integrated circuit. The memory 30 may be an external memory. The functionality of the second configurable processor 5 may be to access the memory 30 for read or write accesses and to indicate the data address to be used by the read or write access. According to some embodiments, an error or manipulation of the first configuration data, or also of the manipulated second configuration data 15, may result in a change of the data processor functionality. Such a change of the functionality may be, for example, that the second configurable processor 5 indicates a different and therefore a faulty address to be used by a read or write access. This means a possible attacker or manipulator of the configuration data would read any stored data on the memory 30, but not the wanted data.

According to another embodiment, the apparatus for processing data comprises a memory 30 and a memory management unit (MMU) 35. The memory management unit 35 may be configured to write data to certain addresses of the memory 30 during the write access and to read data from certain addresses of the memory 30 in a read access. According to this embodiment, the second configuration data comprises address data for the memory management unit 35. As a consequence of a possible manipulation or an error of the first configuration data 20 and/or the manipulated second configuration data 15, the addresses for a write access or a read access to the memory 30 are changed and useless data, from wrong addresses of the memory 30, are read during a read access and write data are stored at an unwanted address of the memory 30.

Figure 4:
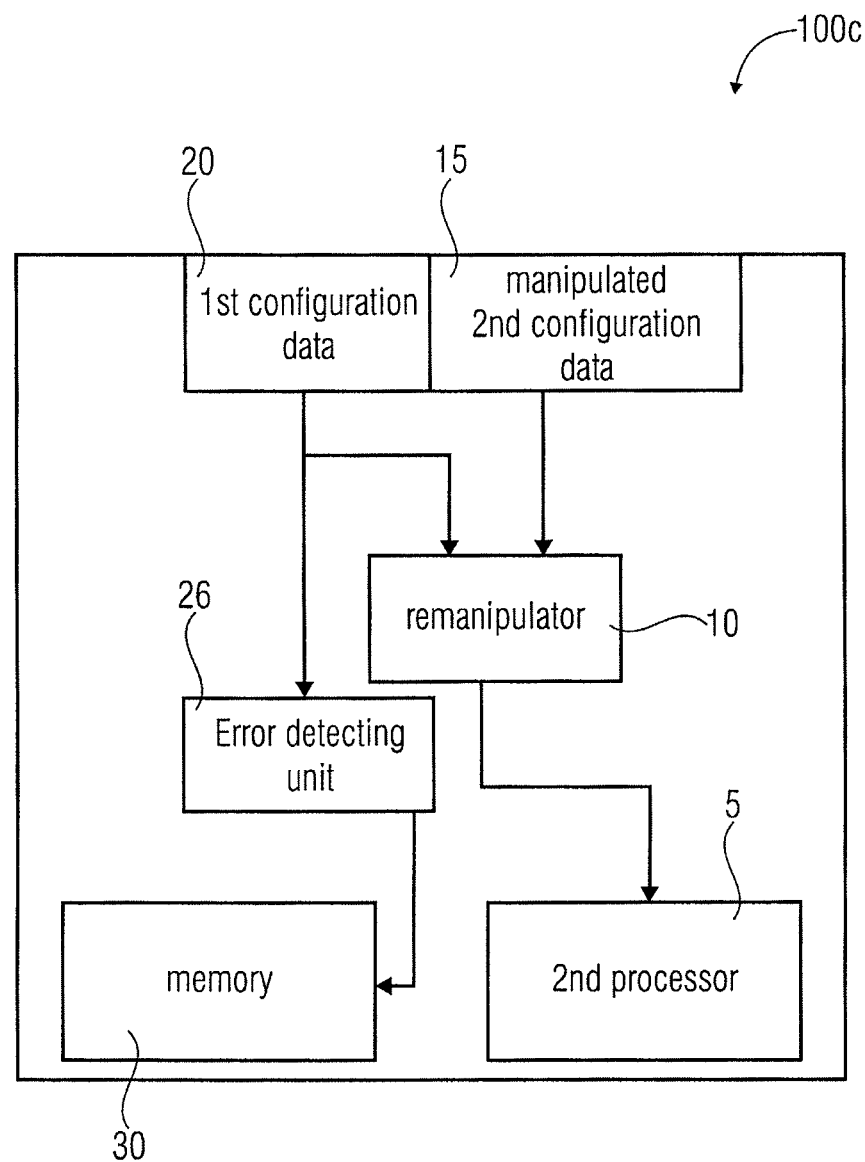
FIG. 4 shows a schematic drawing of an apparatus for processing data, wherein the apparatus comprises an error detection circuit (EDC) for protecting a memory according to another embodiment.

In FIG. 4, another embodiment of an apparatus for processing data is depicted. In this embodiment, the apparatus 100c comprises again a first configurable processor, wherein the first configurable processor is an error detection circuit or unit 26 (EDC), which is configured to detect an error or a manipulation of data which are written to a memory 30 or which read from the memory 30. In this embodiment the first configuration data may relate to an active/inactive signal of the error detection unit 26. In other words, depending on the setting of the first configuration data, the error detection unit 26 may be active or inactive. This means, by setting, for example, a certain bit of the first configuration data, the error detection unit 26 can be turned on or off. A possible attacker or manipulator of the chip may now be interested in turning off the error detection unit 26 and might be therefore interested to change the first configuration data 20 from active to inactive. But a change of the first configuration data, for example, to set the error detection unit 26 from active (EDC_ON) to inactive (EDC_OFF) may result in re-manipulated second configuration data, which may cause the second processor 5 to indicate an alarm or to process data in a way which is indicative for an error or a manipulation.

According to another embodiment, the processing of the data by the second processor 5 after an error or a manipulation of the first configuration data may be performed so that an attack on data or algorithms of the apparatus 10 is rejected or prevented. This may be done, for example, by blocking an access to the data, destroying the data or algorithm or making the data or algorithm of no use for the attacker. The rejection or the defense of an attack may occur according to some embodiments immediately or instantly, after changing the configuration data. Because of this, a continuous online-check of the configuration data is possible. A change of the configuration data may provoke a instantaneous malfunction or abnormal function of the second configurable processor 5. Thereby the second configurable processor 5 may perform a processing of data or a functionality, which is not the direct target of the attack or manipulation.

Figure 5:
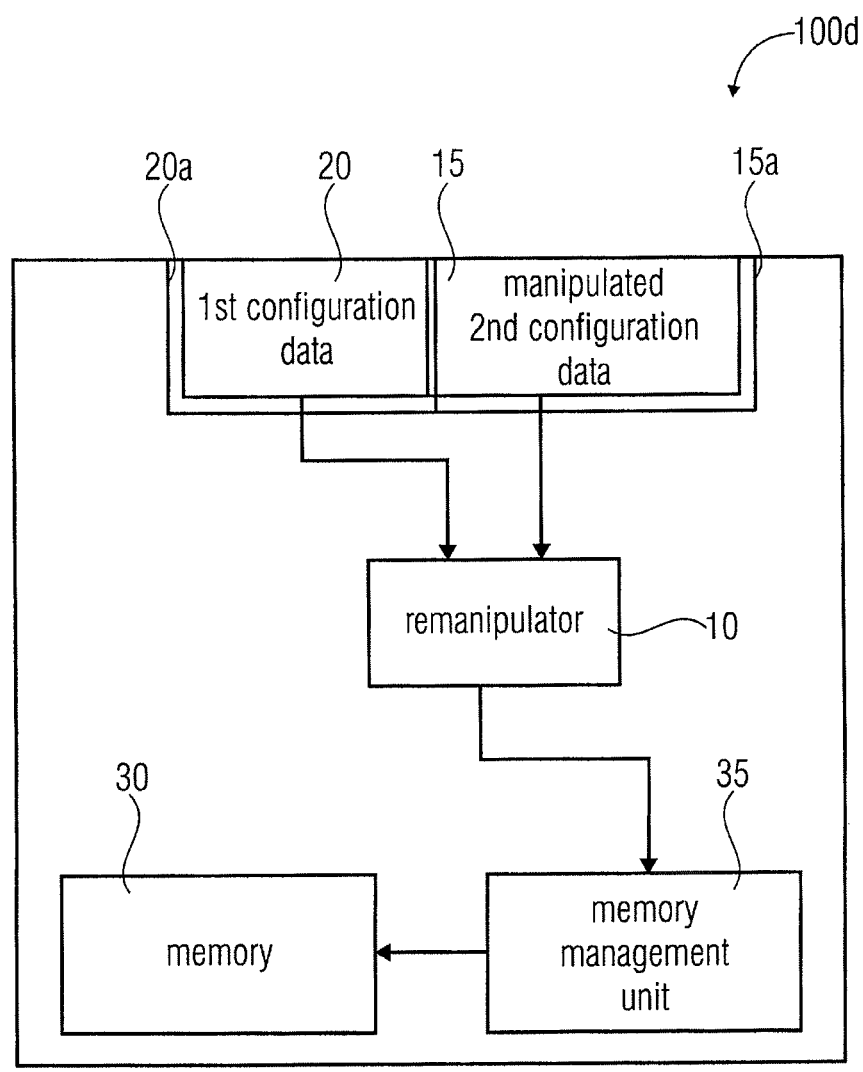
FIG. 5 shows a schematic drawing of an apparatus for processing data with a memory management unit (MMU) for determining access right to a memory coupled to the apparatus according to another embodiment.

According to another aspect of the invention, the apparatus 100d may comprise a second configurable processor 5, which is configured as a memory management unit 35 (FIG. 5) for accessing a memory 30 of the apparatus 100d. The re-manipulator 10 is coupled to the first configuration data, which may be stored in a respective configuration memory place 20a and to a manipulated second configuration data 15, which may be stored as well in a configuration memory place 15a. After re-manipulating the manipulated second configuration data 15 the re-manipulator 10 feeds the second configuration data to the memory management unit (MMU) 35. The second configuration data may determine access rights to the memory 30 for accesses which are performed by the memory management unit 35. In this embodiment the second configurable processor 5 may be a memory management unit 35 and the respective second configuration data may set the access rights to the memory 30. In other words, the second configuration data may set the write, read, execute (r, w, x) rights concerning the memory 30. An error or manipulation of the first configuration data and/or the manipulated second configuration data may result in a change of the second configuration data. By changing the second configuration data, the access rights to the memory 30 may be changed as well. This means that an error or manipulation of the configuration data may result instantly and automatically in a change of the access rights to the memory 30. Because of this, for example, the right to read from the memory 30 may be refused by the change of the second configuration data caused by an error or manipulation.

Figure 6:
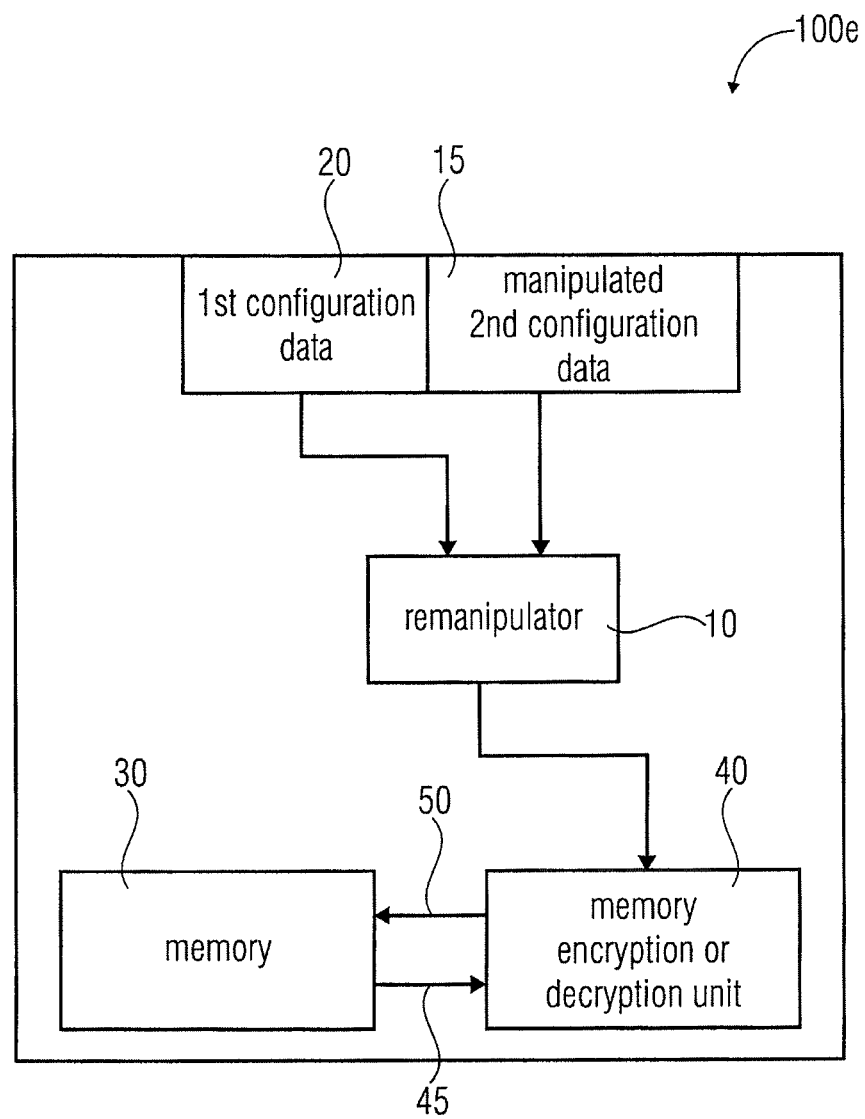
FIG. 6 shows a schematic drawing of an apparatus for processing data, wherein the apparatus comprises a memory encryption/decryption unit (MED) for encrypting or decrypting data written to or read from a memory according to an embodiment.

In FIG. 6, a further schematic drawing of an apparatus 100e for processing data according to an embodiment is shown. According to this embodiment, the second configurable processor 5 may be a memory encryption/decryption device 40 (MED) for encrypting data, which are written 50 to a memory 30 or for decrypting encrypted data read 45 from the memory 30. In this embodiment the second configuration data may influence an encrypting or a decrypting process performed by the memory encryption/decryption device (MED). A second configuration data may, for example, influence the selection of an encryption key or a decryption key, which is used by the memory encryption/decryption unit 40 for encrypting or decrypting data. According to another embodiment, the second configuration data may influence the selection of an encryption or a decryption function or an algorithm, which is used to encrypt or decrypt data, which are written to the memory 30 or read from the memory 30. In other words, the decryption of encrypted data, which are read can be influenced by a change of the second configuration data. The same is true for the encryption of data which are written to the memory 30.

Figure 7:
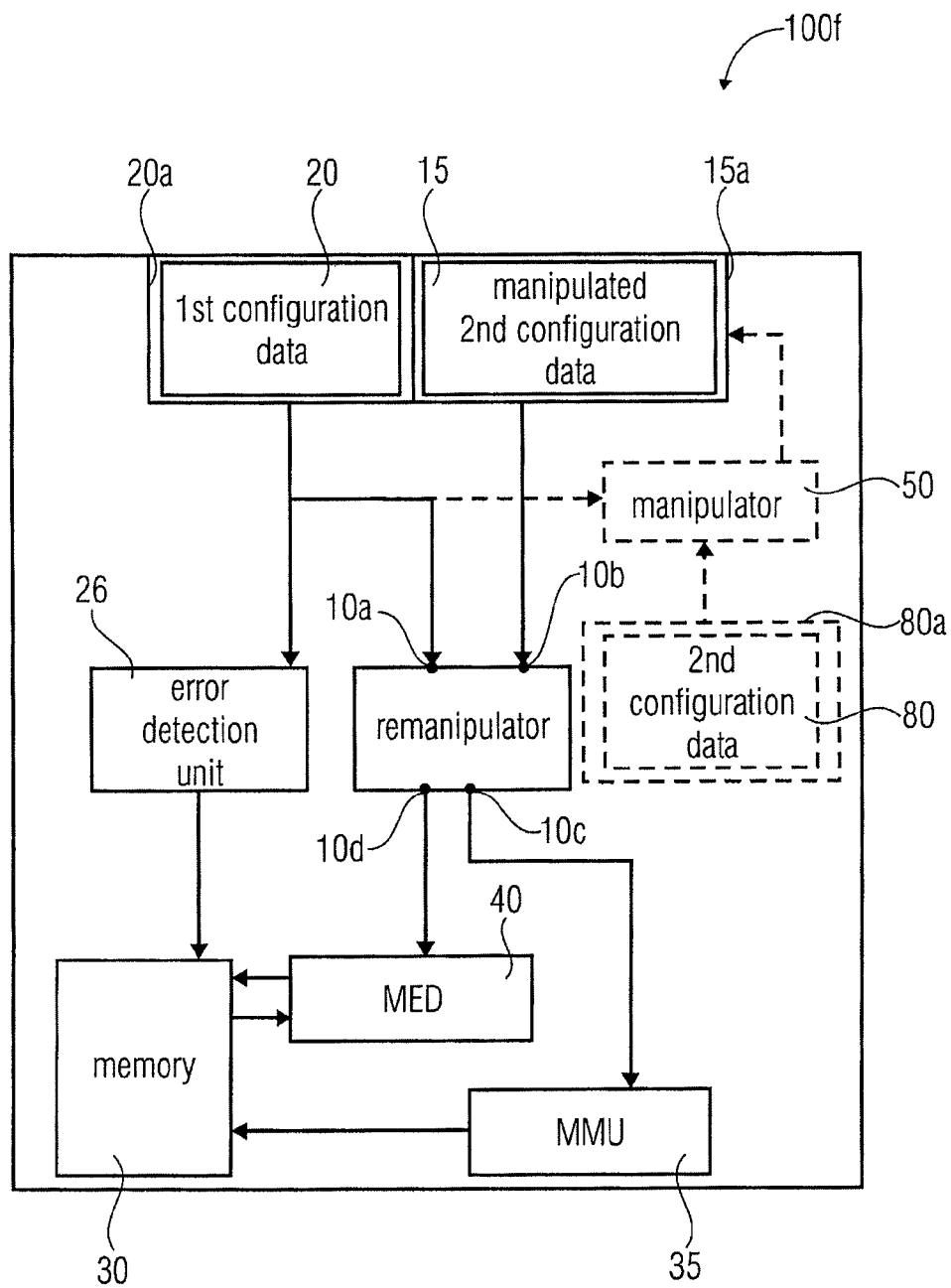
FIG. 7 shows another schematic drawing of an apparatus for processing data, comprising, among others, an error detection unit, a memory encryption/decryption unit, a memory management unit and a memory according to an embodiment.

In FIG. 7, a further embodiment of an apparatus for processing data is shown. In this embodiment the apparatus 100f comprises a first memory place 20a for the first configuration data 20 and a second memory place 15a for the manipulated second configuration data 15. The first configuration data and the manipulated second configuration data may be coupled to a first input 10a and a second input 10b of the configuration data re-manipulator 10. An output 10c of the re-manipulator 10 may be coupled to a memory management unit (MMU) 35 and/or to a memory encryption/decryption unit (MED) 40. The first configuration data may be readable by a first configurable processor, which may be configured as an error detection unit 26. The error detection unit 26 may be configured to detect an error, a malfunction or a manipulation of data stored in the memory 30. The memory management unit 35 may be configured to determine access rights to the memory 30. In this embodiment, the apparatus 100 may comprise optionally a manipulator 50 for manipulating second configuration data. The manipulator 50 may be configured to read first configuration data 20 from the first memory place 20a. Furthermore the manipulator 50 is configured to manipulate the second configuration data depending on the first configuration data 20 to obtain manipulated second configuration data 15 stored on a second memory place 15a. The second configuration data 80 may be stored on another memory place 80a. The manipulator 50 may manipulate the second configuration data 80 to obtain the manipulated second configuration data 15.

An error, a manipulation or an attack on first configuration data 20 or the manipulated second configuration data 15 may result in a change of the output of configuration data read by the configuration data manipulator 10. As a consequence, for example, the MED may encrypt data written to the memory 30 and de-encrypt encrypted data read from the memory 30 immediately in a faulty or useless way for an attacker or manipulator. Because of the changed second configuration data the MMU 35 may change the access rights to the memory 30 and may, for example, block access to the memory 30. The MMU 35 may change the read, write, execute access rights for the memory 30. The first configuration data 20 may comprise a bit for the activation or deactivation of the error detection unit 26, which is detecting error manipulations to memory 30. A possible attack on the first configuration data 20 in order to de-activate the error detection unit 26 may cause instantly a defense of that attack by changing the access rights to the memory 30 and/or changing the encryption/decryption key or function of the MED 40.

Figure 8A:
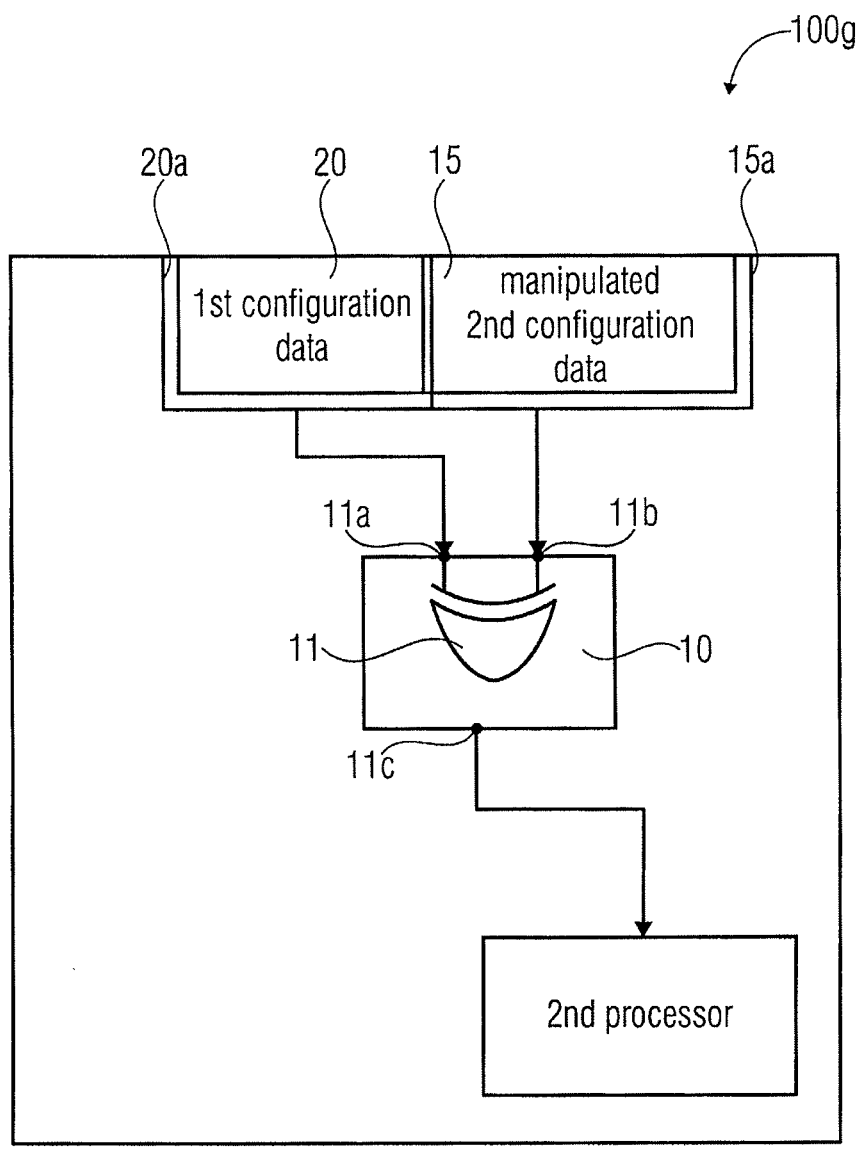
FIG. 8*a* shows a schematic drawing of an apparatus for processing data, wherein a re-manipulator comprises as logic circuit with a XOR-gate according to an embodiment.

As it is shown in FIG. 8a, the apparatus 100g for processing data may comprise a first memory place 20a for the first configuration data 20 and a second memory place 15a for the second configuration data 15. The apparatus may furthermore comprise a configuration data re-manipulator 10, wherein the configuration data re-manipulator 10 comprises a logic circuit. The logic circuit may be, for example, an exclusive OR-(XOR) or a XNOR-gate for performing a bitwise XOR- or XNOR-operation with the first configuration data to obtain a re-manipulation data for the second configuration data. It is also possible that the configuration data re-manipulator 10 comprises a plurality of logic-gates to perform a more complicated logic operation. The logic circuit 11, in FIG. 8a the XOR-gate, may comprise a first input 11a coupled to the first configuration data memory 20a and a second input 11b coupled to the manipulated second configuration data memory 15a. A first memory place may include a flip-flop able to store a logic state—a "0" or a "1". The logic circuit 11 may be configured to perform a logical combination of the first configuration data and the second manipulated configuration data to obtain the second configuration data for the second processor 5.

The manipulated second configuration data 15 may be created by a manipulator, wherein the manipulator also comprises a logic circuit 11 so that depending on first configuration data 20 manipulated second configuration data 15 are obtained. This manipulated second configuration data 15 may then be stored on the apparatus 100 on the respective second memory place 15a. The manipulator 10 may comprise, for example, a XOR- or a XNOR-gate for performing a bitwise XOR- or bitwise XNOR-operation between the first configuration data 20 and the second (un-manipulated) configuration data to obtain the manipulated second configuration data 15. The first memory place 20a for the first configuration data 20 and the second memory place 15a for the second configuration data 15 may be coupled via the configuration data re-manipulator 10 to the second configurable processor 5.

According to an embodiment the apparatus may further comprise a first memory place 20a for the first data 20 and a second memory place 15a for the second configuration data, wherein the logic circuit 11 comprises a first input 11a coupled to the first memory place 20a and a second input 11b coupled to the second memory place 15a and an output 11c coupled to the second configurable processor 5.

According to another embodiment the apparatus may further comprise a first memory place 20a for the first data 20 and a second memory place 15a for the second configuration data. Both memory places may be coupled via the configuration data re-manipulator 10 to the second configurable processor 5.

Figure 8B:
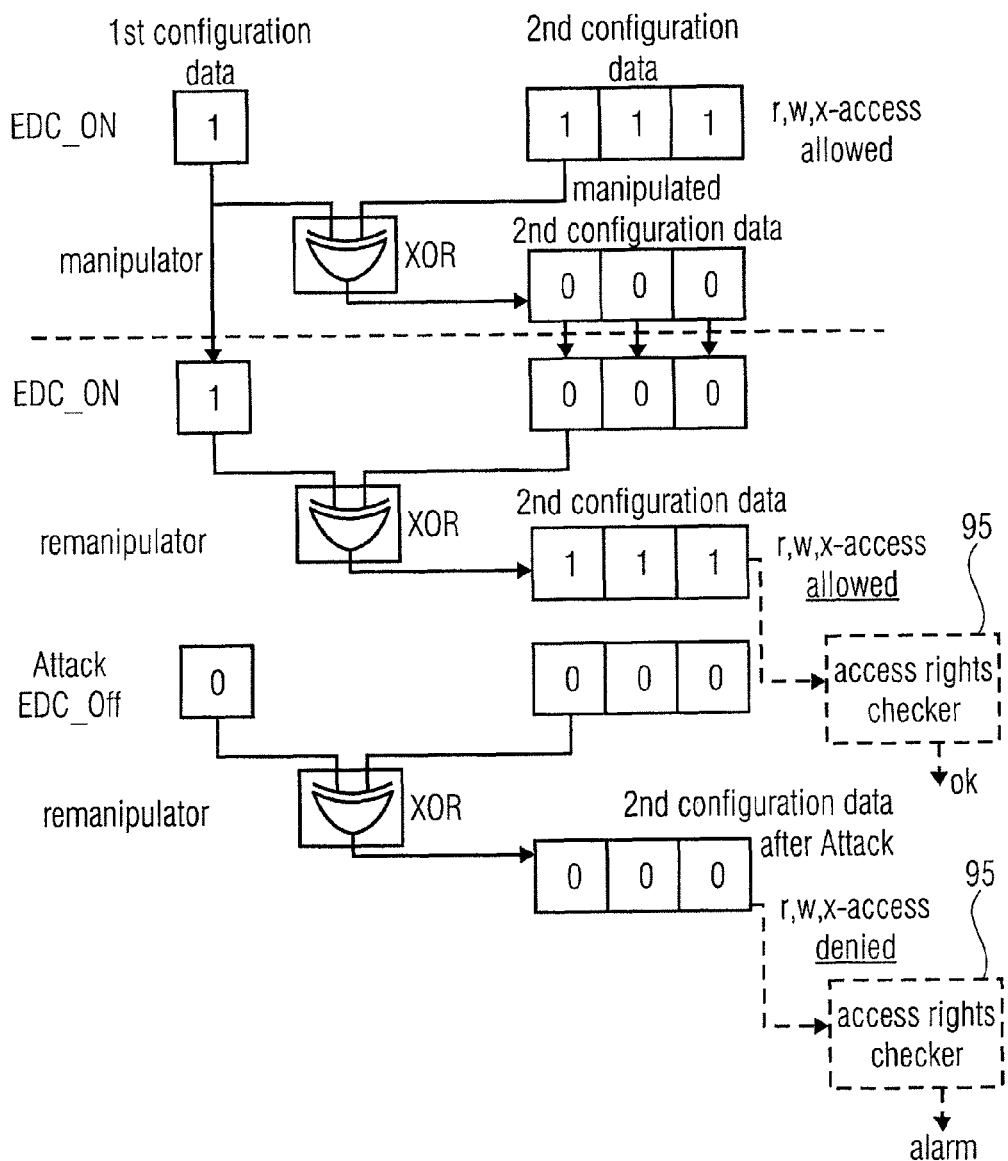
FIG. 8*b* shows a schematic diagram illustrating the functionality of the manipulation and re-manipulation according to an embodiment.

In FIG. 8b, the operation of the manipulator and the re-manipulator 10 for changing the configuration data is schematically illustrated. The first configuration data may comprise an error detection circuit on/off bit (EDC_ON/OFF). The error detection unit 26 may be turned on if the EDC-bit is "1" (EDC_ON) and it may be turned off if the EDC-bit is "0" (EDC_OFF). The un-manipulated second configuration data may be used in the second configurable processor 5 to determine the read, write and execute access rights to the memory 30. If read, write and execute rights are given to a user the three respective bits may be set to "1". By means of a manipulator, which may comprise, as described above a XOR-gate for logically combining the first configuration data and the second configuration data the second manipulated configuration data are obtained. The logically XOR-combination of the EDC-bit "1" with the read, write execute access bits "111" result in the manipulated second configuration data "000". The manipulated second configuration data "000" may be now stored on a register or memory place 15a on apparatus 100, as well as the first configuration data 20 on a memory place 20a. The manipulation may be performed at a different location and on a different apparatus 150 then the re-manipulation. During a regular operation of the apparatus 100 the error detection unit bit EDC_ON may be turned on, that means set "1". The re-manipulator 10 of the apparatus 100 may now perform a XOR logically combination of the EDC_ON bit and the manipulated second configuration data "000". As a result of the logical combination, the original, correct second configuration data "111" for the read, write and execute access can be obtained and can be used by the second configurable processor 5.

In the case of an attack, error or manipulation, for example, on the EDC-bit, in order to turn off the error detection unit 26, the logical combination between the manipulated second configuration data "000" and the manipulated first configuration data "0" results in second configuration data after attack "000", which deny the read, write and execute access rights. In other words, an attack on the EDC-bit to change the security relevant first configuration data from a "1" to a "0" may result in an access denial to a memory 30 of the apparatus by changing the access rights. It is obvious then, of course, also an error or manipulation, attack on the manipulated second configuration data will cause a change of the read, write, execute, access right to the memory 30.

According to another embodiment the apparatus 100 may further comprise an access right checker 95 which is configured to check access rights to a memory 30 of the apparatus. Such an access right checker 95 may be configured to perform an check of the second configuration data. The access right checker 95 in FIG. 8b may be, for example, checking the parity of the read, write, execute, access bits. In case, for example, the sum of the digits is odd, the access rights may be correct and in case of an even sum of the digits, the access rights may be incorrect. As a consequence, a state of alert may be raised by the access right checker 95 if the access rights are incorrect.

Figure 9:
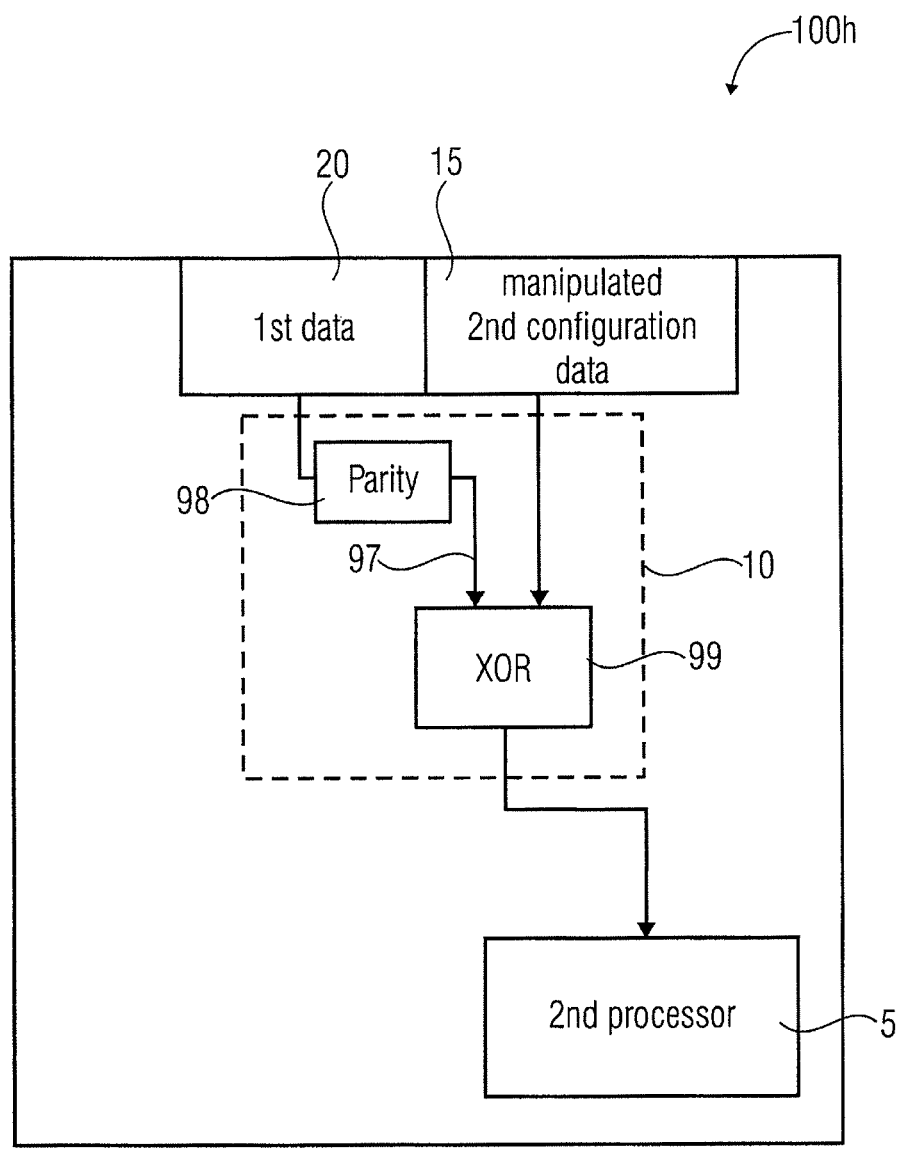
FIG. 9 shows a schematic drawing of an apparatus for processing data with an configuration data re-manipulator comprising a data property calculator and a logic circuit according to a further embodiment.

In FIG. 9 the apparatus 100h for processing data comprises a configuration data re-manipulator 10 with a data property calculator 98 and a logic circuit 99. The data property calculator 98 may be configured to calculate a data property signal 97 of the first data 20 and the logic circuit 99 may be configured to logically combine the data property signal 97 and the manipulated second configuration data 15 to obtain the second configuration.

In this embodiment the first data 20 may be, for example, 32-bit input data and data or bits for granting read, write, execute access rights. The data property calculator 98 may be a parity calculator to calculate a parity of these first data 20. Then the calculated parity may be the data property signal 97. The logic circuit 99 may comprise in this embodiment an exclusive OR (XOR)-gate, for performing a bit-wise XOR-de-masking operation of the manipulated second configuration data 15 and the data property signal 97—the parity of the first data—to obtain the second configuration data. In other embodiments, the data property calculator 98 may perform another logic function for calculating a data property signal 97 of the first data 20.

In some embodiments, the apparatus 100, 100a-i for processing data may further comprise a memory 30, wherein the memory 30 does not store a second configuration data 15 in un-manipulated form and wherein the apparatus has stored the second configuration data 15 in manipulated form only. In other words, a possible attacker or manipulator of the apparatus may not be able to attack directly stored un-manipulated second configuration data.

Figure 10:
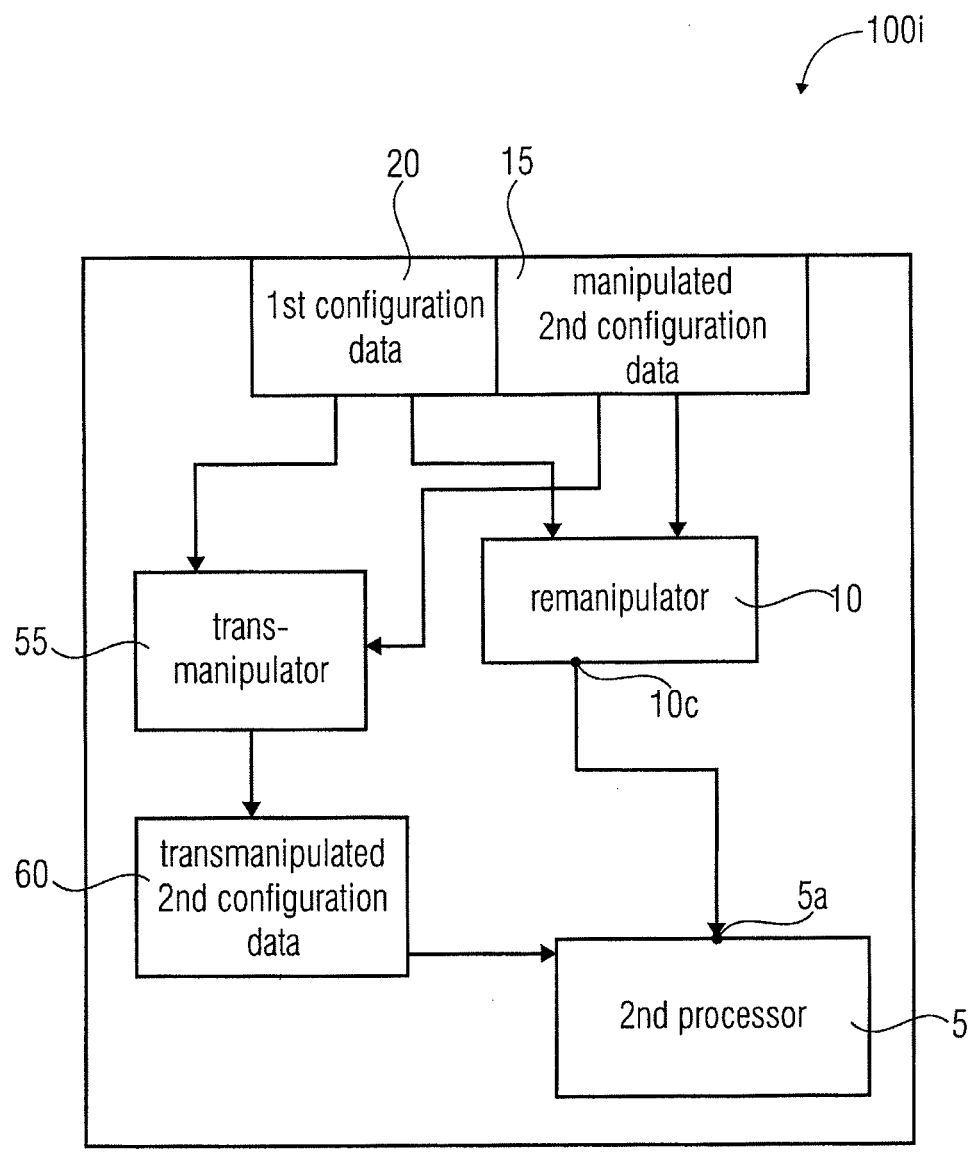
FIG. 10 shows a schematic diagram of an apparatus for processing data, comprising a trans-manipulator and transmanipulated second configuration data according to another embodiment.

In some cases, it might be necessary to change legally the first configuration data 20 or the manipulated second configuration data 15. This means that, for example, for an administrator it may be allowed to change the first configuration data 20 and/or change the manipulated second configuration data 15 so that the second processor 5 is still working in a normal way. For that reason, in FIG. 10, the apparatus 100i comprises a trans-manipulation controller 55 or trans-manipulator 55 coupled to the first configuration data 20 and to the manipulated second configuration data 15, wherein the trans-manipulator 55 or the trans-manipulation controller 55 is configured to re-manipulate upon a change of the first configuration data 20, the manipulated second configuration data 15 using the first configuration data 20 and to manipulate the second configuration data 15 depending on the later first configuration data 20 to obtain changed trans-manipulated second configuration data. The trans-manipulator 55 may be furthermore configured to store the trans-manipulated second configuration data on a memory 60. In other words, the trans-manipulation controller 55 acts as a manipulator in order to generate new manipulated second configuration data depending on the legally changed first configuration data 20 or depending on the legally changed manipulated second configuration data 15.

According to another embodiment, the trans-manipulator 55 may be configured to check whether a change of the first configuration data 20 is an allowed change and as to whether the change is not allowed. The trans-manipulation controller 55 may be configured to raise a state of alert if a change of the first configuration data 20 is not allowed.

In some embodiments of the apparatus for processing data is an output 10c of the configuration data re-manipulator 10 fixed via to a configuration input 5a of the second configurable processor 5. Only the second configurable processor 5 may have the configuration data input 5a so that any configuration data input 5a into the second configurable processor 5 only originates from the configuration data re-manipulator output 10c.

Figure 11:
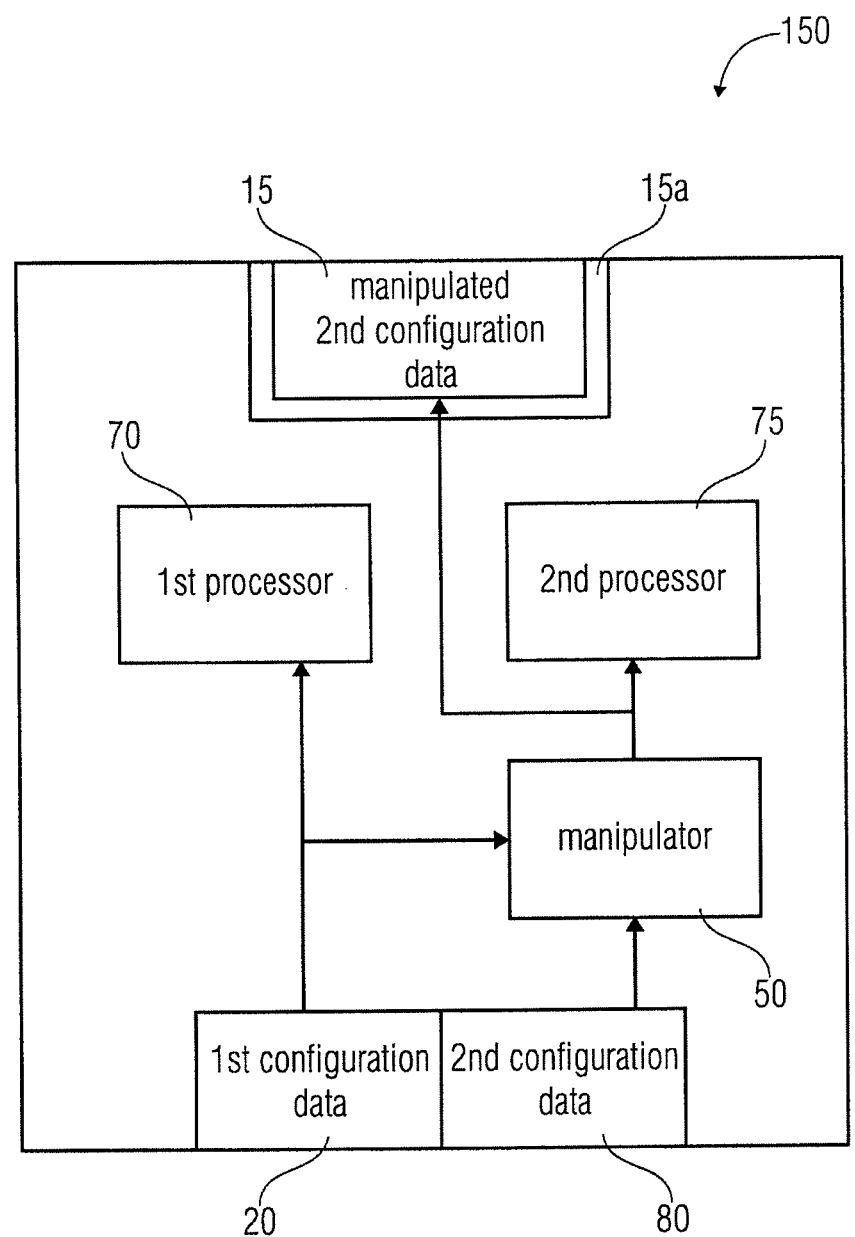
FIG. 11 shows a schematic drawing of an apparatus for processing data with a manipulator for manipulating configuration data to obtain manipulated configuration data according to an embodiment.
Figure 12:
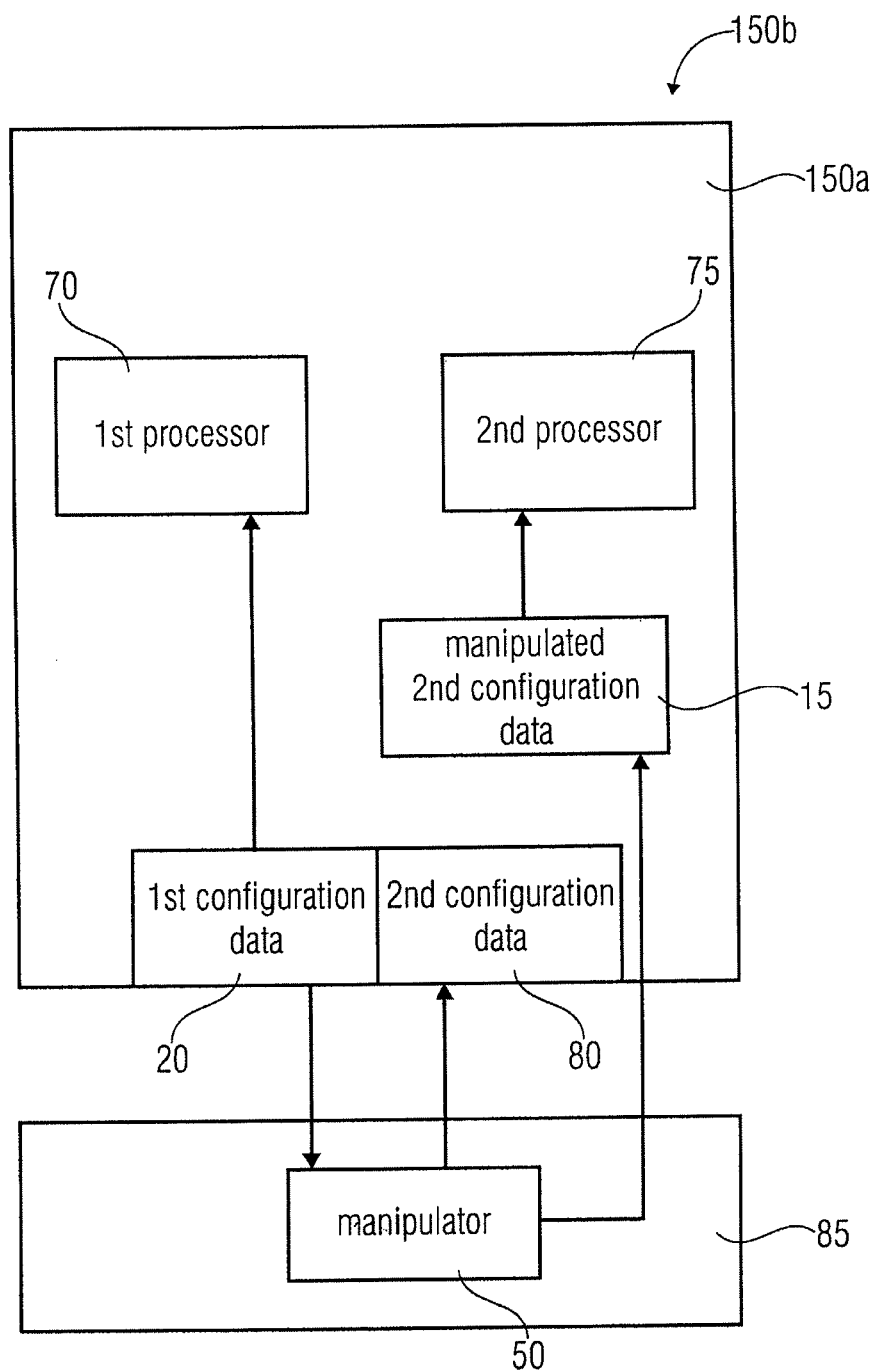
FIG. 12 shows another schematic drawing of an apparatus for processing data, wherein the manipulator is located on a separate circuit board according to an embodiment.
Figure 13:
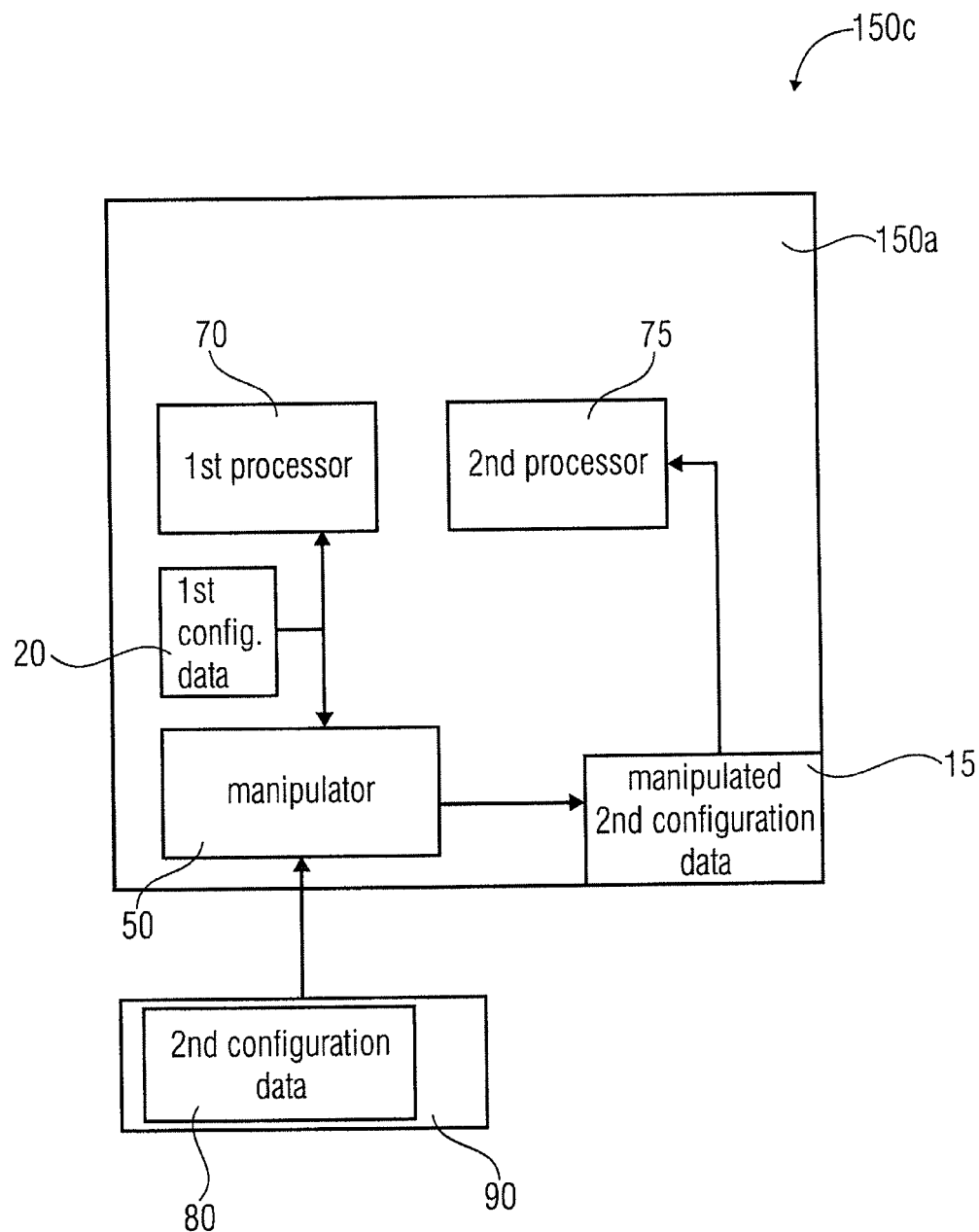
FIG. 13 shows a schematic drawing of an apparatus for processing data, wherein the configuration data to be manipulated are stored in a memory not integrated on the chip according to an embodiment.

In FIG. 11, an apparatus 150 for processing data is shown according to an embodiment. The apparatus 150 for processing data may comprise a first configurable processor 70 being configurable using first configuration data 20 and a second configurable processor 75 being configurable using second configuration data 80. The apparatus 150 further comprising a manipulator 50 for manipulating the second configuration data 20, wherein the manipulator is configured to read or to receive the first configuration data 20 and to read or to receive the second configuration data 80. The manipulator 50 is configured to manipulate the second configuration data 80 to obtain manipulated second configuration data 15. The apparatus 150 comprises furthermore a storage (not shown) for storing the manipulated second configuration data. The storage may be, for example, a read-only memory or any other memory able to store data. According to another embodiment 150b (see FIG. 12), the first configurable processor 70 and the second configurable processor 75 are locally integrated on a chip 150a. In this embodiment, the manipulator 50 is not located on the chip 150a and is located on a separate circuit board 85. That means, the manipulation of the second configuration data 80 can be performed locally separated from the first processor 70 and the second processor 75. As it is shown in FIG. 13, the apparatus 150c may comprise a first configurable processor 70 and a second configurable processor 75 which are locally integrated on a chip 150a. The second configuration data 85 may be stored in a memory 90, wherein the memory 90 is not integrated on the chip 150a. The chip 150a may have stored the second configuration data in manipulated form 15 only. The apparatus 150c may furthermore comprise a manipulator 50 and a first configuration data 20, wherein the first configuration 20 and the second configuration data 80 can be coupled to the manipulator 50 to obtain the manipulated second configuration data 15.

In some embodiments, an apparatus for processing data is shown which can protect or monitor the configuration of a mechanism, a process or a functionality in a chip. Such a configuration can be, for example, a configuration for a security mechanism, a security feature for the protection of data and algorithm on the chip. According to further embodiments, such an apparatus for processing data may furthermore comprise sensor-based protection means or a periodic check of the configuration of an mechanism with means of a software or a user sensor live control (USLC). In other embodiments, the apparatus for processing data may comprise a special coding of the configuration data in order to minimize the probability of an error or manipulation. In embodiments, it is shown that the apparatus for processing data can be implemented with less costs. In an embodiment, only the XOR-gate for the re-manipulator 10 has to be integrated in the integrated circuit. This means that the cost of hardware which is used to implement the apparatus processing data may be less. The same may be true for the time effort which is to spend check the configuration by software.

According to an embodiment of the invention, the apparatus may comprise a first configurable processor or functionality which is configured to perform a security relevant data processing functionality and the processor may comprise a second configurable processor or functionality which is configured to perform another data processor functionality which is not controlled by a configuration data which is controlling the security relevant data processing. In embodiments, a second configurable processor or sub-circuit of an integrated circuit which is not necessarily dependent on a first configuration to be protected is changed so that the second configurable processor is now dependent on the first configuration to be protected. As a consequence, an error or manipulation of the first configuration results in an error of the second configurable processor which might be easily detectable. Therefore, a high protection level by means of very low additional costs of hardware may be achieved. Additionally, the configuration data of the apparatus for processing data can be continually online tracked.

According to some embodiments, the apparatus for processing data may be a security controller. Such a security controller may be, for example, SLE 78 from Infineon technology. The security controller may comprise an error detection circuit (EDC) with a strength of 32 bits for an external memory. According to embodiments, such a controller may comprise a configuration bit in order to turn on or turn off the error detection circuit (EDC_on/off). The error detection circuit can be turned on or off by this configuration bit. This may be done by the memory management unit. An error, a manipulation or an attack on the configuration bit EDC could be performed to turn off the memory protection by the error detection unit 26. Therefore, as it is shown in embodiments, configuration or control bits which are controlling, for example, the memory encryption/decryption unit (MED) and which may be used to select an encryption or decryption key and other control bits or configuration data which may control the access rights (r, w, x) can be, for example, XOR-masks with the configuration bit EDC_OFF, stored. The de-masking or the re-manipulating of the stored manipulated bits may be performed as late as possible or as close as possible to the sub-circuitry performing the access right control and the MED. Because of this, the whole data path and the configuration bits to the respective sub-circuit for the access rights and the MED are protected. If the first configuration data, for example, the EDC_OFF bit is changed to turn it off by an attack, the access rights and the encryption/decryption key selection may be changed at the same time as the EDC_OFF bit. According to an embodiment, the data which are not any more protected by the EDC may lose the access rights. As a consequence, an implemented access right checker for checking the access rights may raise a state of alarm according to an embodiment. By changing the decryption key a whole region or block of a memory cannot be encrypted any more. Since a correct access is not possible any more to the memory, a manipulation or an attack on the first configuration data, for example, the EDC_OFF bit is more complicated. The apparatus for processing data can be easily implemented with an additional mask XOR-gate this is why the protection may be implemented inexpensively. It is obvious that the protection can be implemented cheaply by an XOR-gate and no further detectors or sensors in hardware may necessary and no additional time, for example, for software protection, may be necessary.

According to embodiments, an online protection of the configuration data is possible. If the protection mechanism is considered in the controller architecture, the user can write a mask configuration which may reduce the costs of the hardware further and increase the protection level.

In embodiments, the first data can be an input data for the first processor or an output data of the first processor. The first data can be also an intermediate result for the first processor or an intermediate result of the first processor.

Figure 14:
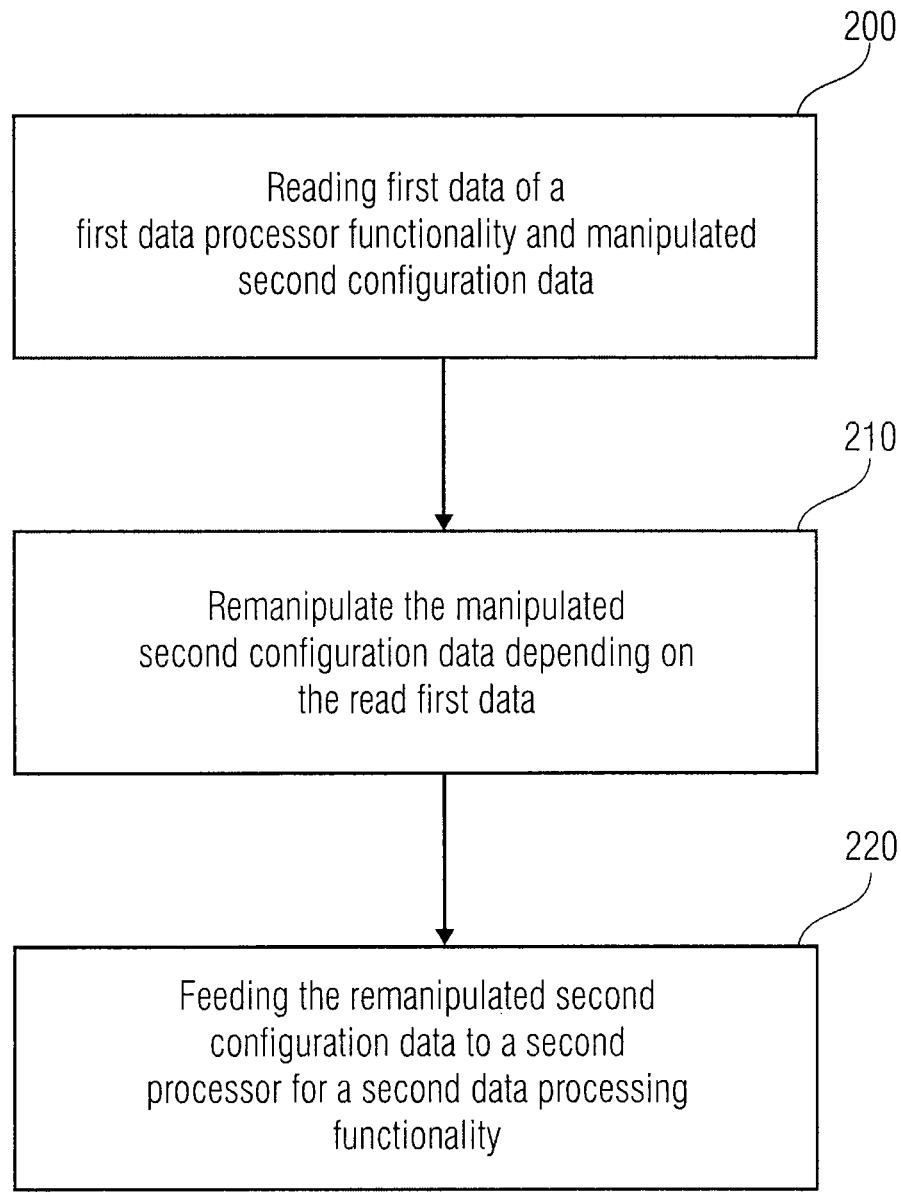
FIG. 14 shows a flowchart for a method for generating re-manipulated configuration data for a data processing functionality according to an embodiment.

In FIG. 14, a flow chart of the method for generating re-manipulated second configuration data for a second data processing functionality is shown. The method comprising reading 200 first data of a first data processor functionality and manipulated second configuration data. The method furthermore comprises re-manipulating 210 the manipulated second configuration data depending on the read first data and feeding 220 the re-manipulated second configuration data for a second data processing functionality to a second configurable processor.

The first data may be related to a security-relevant functionality of a micro controller. The re-manipulation of the manipulated second configuration data may be performed by logical combining the first data with the manipulated second configuration data in order to obtain the second configuration data for a second configurable processor.

Figure 15:
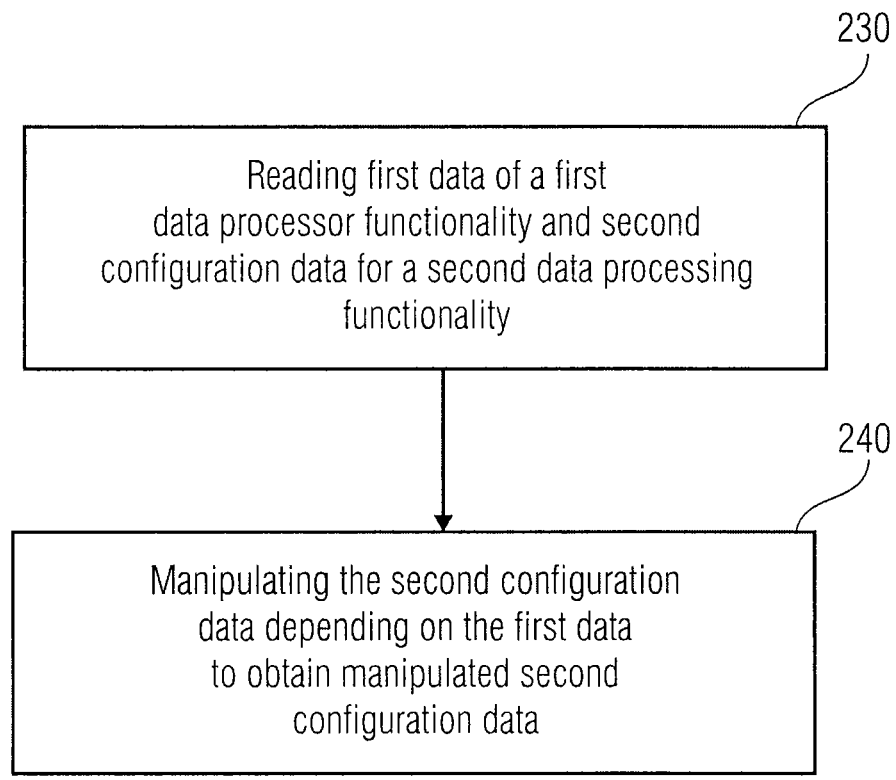
FIG. 15 shows a flowchart for a method for generating manipulated configuration data for a data processing functionality according to another embodiment.

In FIG. 15, the flow chart of a method for generating manipulated second configuration data for a second data processing functionality is shown. The method comprises reading 230 first data of a first data processing functionality and a second configuration data for a second data processing functionality and a manipulating 240 the second configuration data depending on the read first data to obtain manipulated second configuration data.

According to some embodiments a method is described to protect a first configuration for an first mechanism by change of a second configuration for an second mechanism by the first configuration in order to detect by means of the mechanism an error and/or a manipulation in the first configuration.

The invention claimed is:

1. An apparatus for processing data, comprising:
a second configurable processor configured in accordance with second configuration data to process data; and
a configuration data re-manipulator configured to:
retrieve manipulated second configuration data and first data of a first processor, wherein the first processor is a configurable processor, and wherein the first data is first configuration data for the first configurable processor, and wherein the first configurable processor is configured in accordance with the first configuration data;
re-manipulate the manipulated second configuration data depending on the first data; and
feed the re-manipulated second configuration data to the second configurable processor and configure the second configurable processor in accordance with the re-manipulated second configuration data,
wherein the configuration data re-manipulator comprises a logic circuit configured to logically combine the first data and the manipulated second configuration data to obtain the re-manipulated second configuration data, wherein the logic circuit comprises an exclusive OR (XOR)-gate or an XNOR-gate for performing a bitwise XOR- or XNOR-operation with the first data to obtain re-manipulation data for the second configuration data.

2. The apparatus according to claim 1, wherein the first processor is configured to perform a security relevant data processing functionality, and wherein the second configurable processor is configured to perform a data processor functionality depending on the second configuration data.

3. The apparatus according to claim 1, wherein the second configurable processor is configured to output an error message or an erroneous processing result, wherein the re-manipulated second configuration data output by the configuration data re-manipulator are different from second configuration data before a configuration data manipulation.

4. The apparatus according to claim 1, further comprising:
a memory configured to store data at data addresses, and wherein the second configurable processor is configured to access the memory for a read or write access,
wherein the second configuration data indicates the data address to be used by the read or write access.

5. The apparatus according to claim 1, wherein the first processor is an error detection unit configured to detect an error or manipulation of data written to or read from a memory, and wherein the first data relates to an active/inactive signal of the error detection unit.

6. The apparatus according to claim 1, further comprising a memory,
wherein the second configurable processor is a memory management unit configured to access the memory, and wherein the second configuration data determines access rights to the memory for accesses performed by the memory management unit.

7. The apparatus according to claim 1, further comprising: a memory,
wherein the second configurable processor is a memory encryption/decryption device configured to encrypt data to be written to the memory or to decrypt encrypted data read from the memory, and
wherein the second configuration data are influencing an encrypting or decrypting process performed by the memory encryption/decryption device.

8. The apparatus according to claim 1, further comprising: a memory; and
a memory management unit configured to write data to addresses of the memory in a write access or to read data from addresses of the memory in a read access,
wherein the second configuration data comprises address data for the memory management unit.

9. The apparatus according to claim 1, wherein the configuration data re-manipulator comprises a data property calculator configured to calculate a data property signal of the first data and a logic circuit configured to logically combine the data property signal and the manipulated second configuration data to obtain the second configuration data.

10. The apparatus according to claim 1,
wherein the first processor is configured to use or generate the first data at a first time instant, and
wherein the configuration data re-manipulator is configured to re-manipulate the manipulated second configuration data depending on the first data at a second time instant being later than the first time instant.

11. The apparatus according to claim 1, further comprising a memory, wherein the memory does not store the second configuration data and the re-manipulated second configuration data, and the apparatus is configured to store the manipulated second configuration data only.

12. The apparatus according to claim 1, further comprising a trans-manipulation controller configured to re-manipulate, upon a change of the first data, the manipulated second configuration data using the changed first data and to manipulate the second configuration data depending on the later first data to obtain changed trans-manipulated second configuration data and to store the trans-manipulated second configuration data on a memory.

13. The apparatus according to claim 12, wherein the trans-manipulation controller is configured to check whether a change of the first data is an allowed change.

14. The apparatus according to claim 1, further comprising a manipulator configured to read the first configuration data and to manipulate the second configuration data, depending on the first configuration data to obtain the manipulated second configuration data.

15. The apparatus according to claim 1, wherein a configuration data re-manipulator output is fixedly wired to a configuration input of the second configurable processor and the second configurable processor only has the configuration data input, so that any configuration data input into the second configurable processor only originates from the configuration data re-manipulator output.

16. The apparatus according to claim 1, being an integrated circuit on a chip.

17. An apparatus for processing data, comprising:
a second configurable processor configured to process data using second configuration data; and
a configuration data re-manipulator configured to retrieve manipulated second configuration data and first configuration data of a first configurable processor, and to re-manipulate the manipulated second configuration data depending on the first configuration data and to feed the re-manipulated second configuration data to the second configurable processor as the second configuration data; and
the first configurable processor, wherein the first configurable processor is configured in accordance with the first configuration data;
wherein the first configurable processor is an error detection unit configured to detect an error or manipulation of data written to or read from a memory, and wherein the first configuration data relates to an active/inactive signal of the error detection unit, and
wherein the second configurable processor is a memory management unit configured to access a memory, and the second configuration data determines access rights to the memory for accesses performed by the memory management unit, or
wherein the second configurable processor is a memory encryption/decryption device configured to encrypt data to be written to the memory or to decrypt encrypted data read from the memory, and the second configuration data influence an encryption/decryption process performed by the memory encryption or decryption device,
wherein the configuration data re-manipulator comprises a logic circuit configured to logically combine the first configuration data and the manipulated second configuration data to obtain the re-manipulated second configuration data, wherein the logic circuit comprises an exclusive OR (XOR)-gate or an XNOR-gate for performing a bit wise XOR- or XNOR-operation with the first configuration data to obtain re-manipulation data for the second configuration data.

18. An apparatus for processing data, comprising:
a first configurable processor being configured using first configuration data;
a second configurable processor being configured using second configuration data;
a manipulator configured to read the first configuration data, and to manipulate the second configuration data using the first configuration data to obtain manipulated second configuration data; and
a storage configured to store the manipulated second configuration data,
a re-manipulator, wherein the re-manipulator comprises a logic circuit configured to logically combine the first configuration data and the manipulated second configuration data to obtain the re-manipulated second configuration data, wherein the logic circuit comprises an exclusive OR (XOR)-gate or an XNOR-gate for performing a bit wise XOR- or XNOR-operation with the first configuration data to obtain re-manipulation data for the second configuration data.

19. The apparatus according to claim 18, wherein the first configurable processor and the second configurable processor are integrated on a chip, and the manipulator is located on a separate circuit board.

20. The apparatus according to claim 18, wherein the first configurable processor and the second configurable processor are integrated on a chip, the second configuration data are stored in a memory not integrated on the chip, and the chip stores the second configuration data in manipulated form only.

21. A method for generating re-manipulated second configuration data for a second data processing functionality, comprising:
reading first configuration data of a first configurable processor functionality, and manipulated second configuration data, wherein the first configurable processor functionality is configured in accordance with the first configuration data;
re-manipulating the manipulated second configuration data depending on the read first configuration data; and
feeding the re-manipulated second configuration data for a second data processing functionality to a second configurable processor and configuring the second configurable processor in accordance with the re-manipulated second configuration data,
wherein the re-manipulating comprises using a logic circuit configured to logically combine the read first configuration data and the manipulated second configuration data to obtain the re-manipulated second configuration data, wherein the logic circuit comprises an exclusive OR (XOR)-gate or an XNOR-gate for performing a bit wise XOR- or XNOR-operation with the first configuration data to obtain re-manipulation data for the second configuration data.

22. A method for generating manipulated second configuration data for a second data processing functionality, comprising:
reading first configuration data of a first configurable processor functionality, and second configuration data for a second configurable data processing functionality, wherein the first configurable processor functionality is configured in accordance with the first configuration data, and the second configurable data processing functionality is configured in accordance with the second configuration data; and
manipulating the second configuration data depending on the read first configuration data to obtain manipulated second configuration data,
re-manipulating the manipulated second configuration data, wherein the manipulating re-manipulating comprises using a logic circuit configured to logically combine the read first configuration data and the manipulated second configuration data to obtain the manipulated re-manipulated second configuration data, wherein the logic circuit comprises an exclusive OR (XOR)-gate or an XNOR-gate for performing a bit wise XOR- or XNOR-operation with the first configuration data to obtain re-manipulation data for the second configuration data.

23. An apparatus for processing data, comprising:
a first configurable processor configured to process data using first configuration data, wherein the first configurable processor is configured in accordance with the first configuration data;
a manipulator configured to read second data of a second processor, wherein the functionality of the second processor is configured in accordance with the second data, and to manipulate the first configuration data, depending on the second data to obtain manipulated first configuration data;
a configuration data re-manipulator configured to:
retrieve the manipulated first configuration data and the second data;
re-manipulate the manipulated first configuration data depending on the second data; and
feed the re-manipulated first configuration data to the first configurable processor and configure the first configurable processor in accordance with the re-manipulated first configuration data,
wherein the configuration data re-manipulator comprises a logic circuit configured to logically combine the manipulated first configuration data and the second data to obtain the re-manipulated first configuration data, wherein the logic circuit comprises an exclusive OR (XOR)-gate or an XNOR-gate for performing a bit wise XOR- or XNOR-operation with the second data to obtain re-manipulation data for the first configuration data.

* * * * *